United States Patent [19]
Hartung

[11] 4,325,622
[45] Apr. 20, 1982

[54] COUPLING FILM ADVANCE AND SHUTTER RELEASE FOR A STILL CAMERA

[75] Inventor: Hansjürgen Hartung, Wolfenbüttel, Fed. Rep. of Germany

[73] Assignee: Rollei-Werke Franke & Heidecke GmbH & Co. KG, Brunswick, Fed. Rep. of Germany

[21] Appl. No.: 207,881

[22] Filed: Nov. 18, 1980

[30] Foreign Application Priority Data

Dec. 1, 1979 [DE] Fed. Rep. of Germany ....... 2948525

[51] Int. Cl.³ ............................ G03B 1/12; G03B 1/00
[52] U.S. Cl. ..................................... 354/170; 354/212
[58] Field of Search ............................. 354/170–173, 354/212–215; 242/71.3, 74

[56] References Cited

U.S. PATENT DOCUMENTS

| | | | |
|---|---|---|---|
| 1,413,187 | 4/1922 | Paumier | 354/212 X |
| 2,782,701 | 2/1957 | Helber | 354/173 |
| 3,659,798 | 5/1972 | Mindler et al. | 242/71.3 |
| 4,190,341 | 2/1980 | Sugimori | 354/173 |

FOREIGN PATENT DOCUMENTS

| | | | |
|---|---|---|---|
| 1071940 | 6/1967 | United Kingdom | 354/173 |
| 1162894 | 8/1969 | United Kingdom | 354/214 |

*Primary Examiner*—Donald A. Griffin
*Attorney, Agent, or Firm*—Schwartz, Jeffery, Schwaab, Mack, Blumenthal & Koch

[57] ABSTRACT

Disclosed is a coupling for the connection of a drive motor to a still camera to facilitate automated cocking and actuation of the camera. The coupling has two major portions one of which rotates with a drive motor and the other of which rotates with the film transport advance drum. One of the portions will be a cam and the other portion a cam biassing device such that under low torque loads being transmitted from the drive motor to the film transport advance drum, the two portions rotate together. When the film has been wound, the film transport advance drum stops suddenly increasing the torque transmitted between the still moving motor and the transport advance drum. When the torque reaches a preset maximum amount, the cam biassing device slips relative to the cam and actually drives itself in a reverse direction. An additional apparatus is provided which free-wheels in the normal direction and couples movement in a reverse direction to a shutter release mechanism which insures that the picture is taken while the film transport advance drum is motionless. Specific embodiments showing the motor powering either the cam or the cam biassing device are disclosed.

17 Claims, 4 Drawing Figures

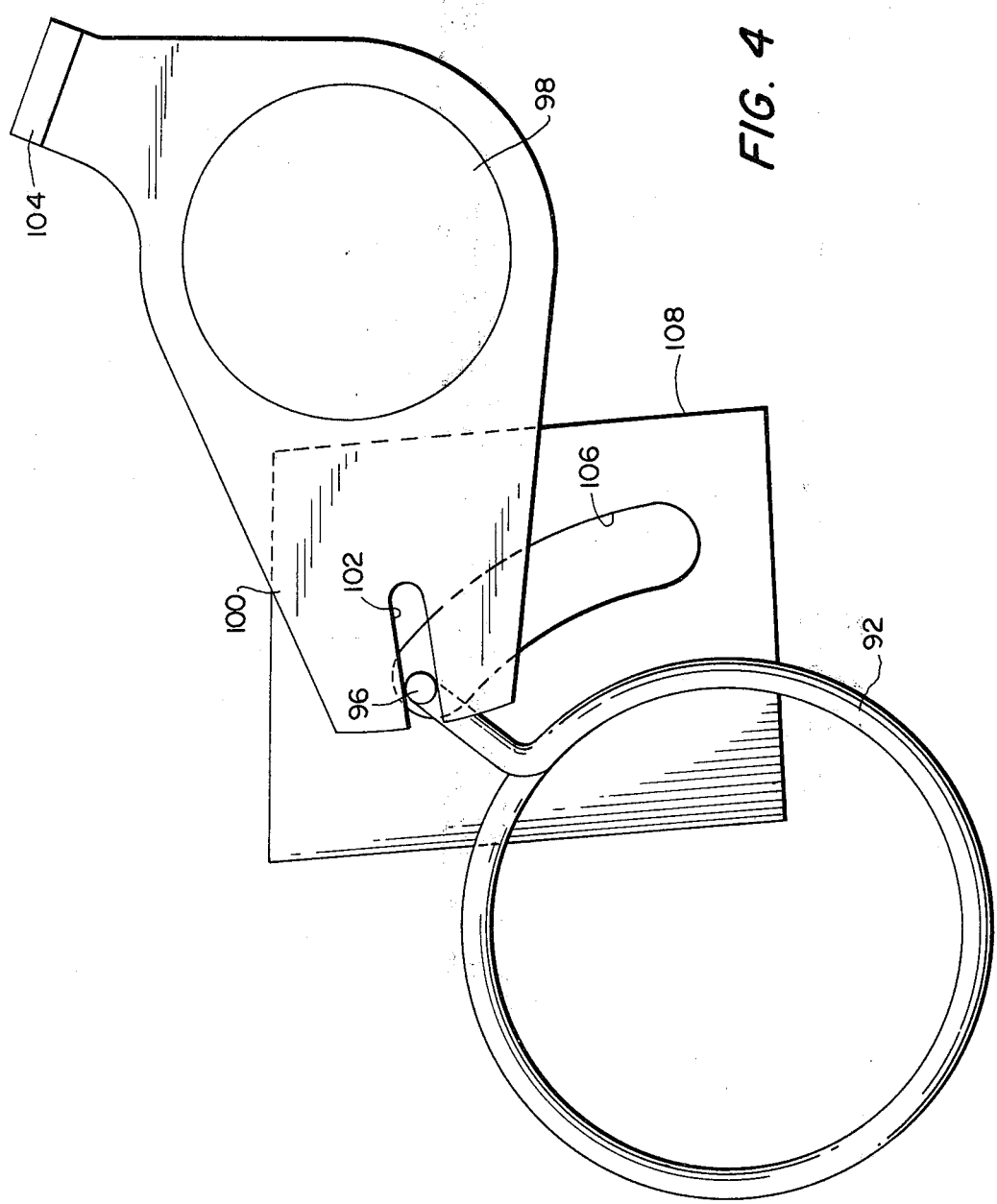

COUPLING FILM ADVANCE AND SHUTTER RELEASE FOR A STILL CAMERA

BACKGROUND OF THE INVENTION

The present invention relates generally to still cameras and particularly to the automated film advance and shutter release used in conjunction with a motor driving a still camera.

Prior art camera drive systems operate in basically two modes—taking single pictures in which the camera operator actuates the shutter mechanism and in the automatic mode in which a sequence of pictures is taken while the shutter mechanism is held in the operative position. In order to permit the operator actuation of the shutter release mechanism, a typical prior art system will stop the drive motor's operation. However, when this device is operated with the shutter release mechanism held down by the camera operator (so that it takes a sequence of still pictures) the motor alternately starts and stops slowing overall frequency of operation.

Additionally the prior art mechanisms for connecting the drive motor to the still camera are relatively complex and difficult to manufacture such that they operate in a reliably consistent manner. Additionally, most prior art couplings require that the drive motor operate a predetermined period of time in order to drive the film advance drum the distance of one frame. Thus the number of rotations of the film advance drum for one camera may be different from the number of rotations for another camera and thus the automatic drive device would not be compatable between the two cameras.

In still other prior art camera drive systems, the camera is set and the film advance drum advanced by one motor and the shutter release is actuated by a different motor. In prior art cameras, it is desirable to ensure that the film advance drive motor has stopped completely prior to releasing the camera shutter in order to provide that the film does not move during the actual exposure. This also reduces the frequency of operation of the camera in the automatic mode.

SUMMARY OF THE INVENTION

In view of the disadvantages of prior art devices coupling the drive motor to a still camera, it is an object of the present invention to provide a drive motor to camera coupling which is interchangeable between cameras having different amounts of film transport advance drum rotation.

It is a further object of the present invention to provide a drive motor to still camera coupling which does not require the drive motor to stop rotating during the automatic mode of operation.

It is a still further object of the present invention to provide a drive motor to still camera coupling which insures that there is no movement of the film transport advance drum during shutter release accompanying automatic operation.

It is an additional object of the present invention to provide a drive motor to still camera coupling which is simple in manufacture and yet reliable in operation.

The above and other objects are achieved by providing a coupling between a drive motor and a still camera which comprises a cam rotatable with one of the drive motor or film transport advance drums; a cam biassing structure which is rotatable with the other of the drive motor and film transport advance drum. The cam biassing device transmits torque between the drive motor and the film transport advance drum up to a maximum permitted torque. After the maximum torque is reached, the cam biassing device actually permits a reduction in torque transmitted and facilitates the movement of the cam in a reverse or opposite direction. A sutter coupling is provided which rotates with the cam biasser when it is moving in its reverse or opposite direction and "free wheels" when the cam biassing device rotates in the drive direction under the driving torque. This shutter coupling ensures that the shutter release of the still camera is not actuated until the cam biassing device is moving in the opposite direction which in turn provides that the film transport mechanism is not moving at all during shutter release.

BRIEF DESCRIPTION OF THE DRAWINGS

Additional advantages and features of the present invention will be more clearly understood by reference to the drawings wherein:

FIG. 4 is a top view of one apparatus for transmitting shutter release movement.

DETAILED DESCRIPTION OF PREFERRED EMBODIMENTS

Figure 1:
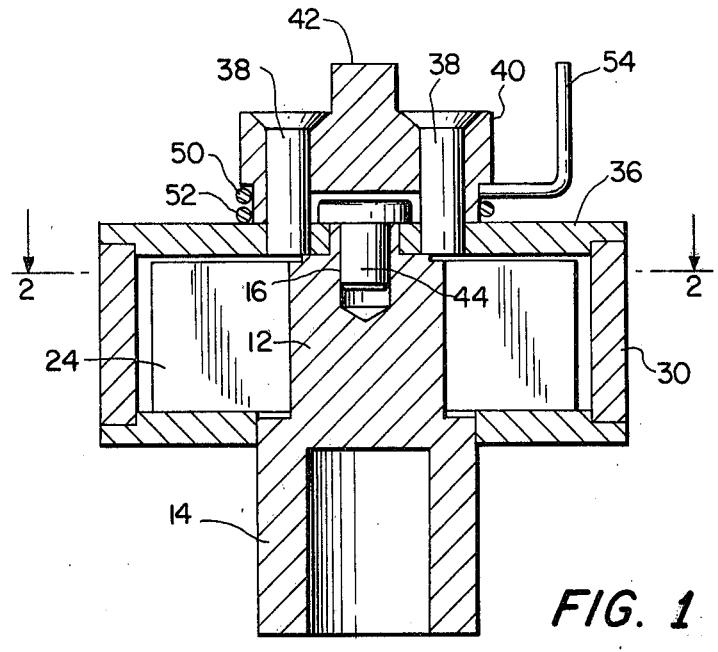
FIG. 1 is a side cross-sectional view of one embodiment of the present invention.
Figure 2:
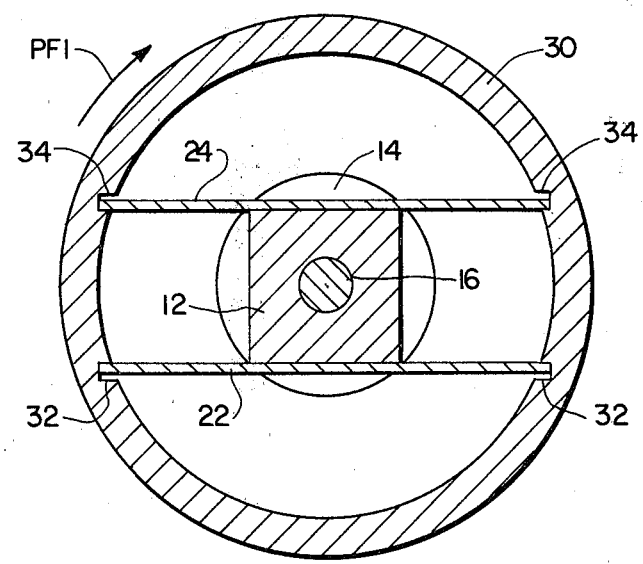
FIG. 2 is a cross-sectional view of FIG. 1 along section line 2—2.

Identical reference numerals designate identical parts throughout the several views. FIGS. 1 and 2 are directed towards one embodiment of the present invention in which a cam means is made up of a square stressing part 12 and a cam biassing means is made up of spring plates 22 and 24 mounted in grooves 32 and 34, respectively, in the inner wall of hollow cylinder 30. The square stressing part 12 is rotatable with the driven shaft 14 connected to the camera drive motor (not shown).

A gudgeon 40 is attached to upper end wall 36 of cylindrical body 30 by means a screws 38 in one preferred embodiment. The gudgeon merges into a coupling stem 42 at a central top area. For centering gudgeon 40, a bore hole 16 is provided in the square stressing part 12. The centering pin 44 projects downwardly from gudgeon 40 into bore hole 16. In the lower circumferential region of gudgeon 40 is a recess 50 in which a winding spring 52 is disposed, with the free end of the winding spring turned into an upwardly projecting portion 54 which in one embodiment may serve to trigger the release mechanism. It can be seen that pressure on upwardly turned portion 54 in one rotational direction will serve to cause the spring coil to tighten around the recess 50 preventing any further rotational movement thereof. However in the other rotational direction, the spring will tend to become uncoiled from the gudgeon and thus will slip permitting a certain amount of "free wheeling" on the spring's part.

Thus the FIG. 1 assembly comprises three main parts: a cam means in the form of square block part 12; a cam biassing means in the form of spring plates 22 and 24; and a shutter coupling means comprising the spring 52 with upturned portion 54.

If the drive motor is connected to shaft 14, square block 12 will be driven with a certain angular velocity by the drive motor. The square block 12 is squeezed between spring plates 22 and 24 and thus will transmit torque from shaft 14 to the cylindrical body 30. If there is no resistance to this force, the cylindrical body 30 will rotate with the same angular velocity as the square block part 12. The coupling stem 42 is engaged in a coupling recess (not shown) in a film transport advance drum. Thus, when there is little or no resistance to rotation of the film advance drum, the drum will be rotated at the same angular velocity as the shaft 14. This rotational direction is in the direction of arrow PF1 as shown in FIG. 2. During this film advance portion of the rotation, the projection 54 of winding spring 52 will remain in its position shown as the rotation of gudgeon 40 is in a direction to cause the coil spring to unwind slightly increasing its diameter such that the gudgeon freely rotates therein.

When the camera has been cocked and film transported by means of rotation of the film transport drum, the internal mechanism of the camera will prevent further movement of the transport drum. At this point, while the drive motor continues to turn shaft 14, rotation of the square block 12 relative to cylindrical body 30 will begin. During this relative rotation, the spring plates will be bowed apart by the opposed edges of the square block. It can be seen that an increasing amount of torque will be necessary as the block 12 is rotated relative to cylindrical block 30. It can be seen that the torque transmitted will rise to a maximum level and then begin to decrease as a line connecting the opposite edges of the square block approaches a line perpendicular to the plane of the spring plates 22 and 24.

At the point at which the line connecting opposite corners of the square block 12 is perpendicular to the plane of the spring plates, no further deformation of the spring plates is achieved by further rotation of the square block. Therefore, the only resistance to rotation is in frictional contact between the opposed edges of the square block and the spring plates themselves. Up to this point, the increasing restoring force of springs 22 and 24 has acted so as to oppose the square blocks turning in the direction of motion shown by arrow PF1. With further rotation of the square block relative to the spring plates, the maximum deformation is passed and the spring biasses the square block in the direction of arrow PF1. Since the square block is connected to the drive motor via shaft 14 and, thus cannot be accelerated, the effect of the restoring force of spring plates 22 and 24 is to cause the cylindrical body 30 to rotate in a direction opposite to the drive direction of arrow PF 1. Clearly, movement of the cylindrical body in this opposite direction will continue until the spring plates are either not deformed at all or are only minimally deformed. It can be seen that the amount of rotation in this opposite direction is a function of the cam biassing means (in this embodiment including spring plates 24 and 24) and the cam means itself (in this embodiment the square block 12). It is clear that different cam means and cam biassing means will provide different amounts of movement in the opposite direction and will also provide different amounts of maximum transmitted torque as may be necessary for a particular application.

During the movement of cylindrical body 30 in the opposite direction, the winding spring 52 is caused to tighten in its coil around gudgeon 40 such that it frictionally engages the gudgeon causing projection portion 54 of the spring to also move backward in the direction opposite to that of arrow PF1. Movement in this direction causes the upwardly projecting portion 54 to contact a camera shutter release mechanism causing the camera to "take" a picture. Additionally, while the cylindrical body 30 is moving in the opposite direction to the drive direction, the drive motor may be continuing to run forcing square block 12 to continue to rotate in the drive direction. As noted earlier, as soon as the spring plates are again flat against the sides of square block 12, torque is again transmitted through the square block 12 and spring plates 22,24 to the cylindrical body 30 causing it to rotate in the drive direction (arrow PF1) advancing the film transport advance drum and recocking the shutter for further actuation. It can be seen then that during automatic operation, the drive motor need not stop or slow down and yet because the shutter release mechanism is actuated only during the opposite direction movement of cylindrical body 30, there is no possibility of film transport during shutter release and blurring of the picture as a result therefrom is prevented.

Figure 3:
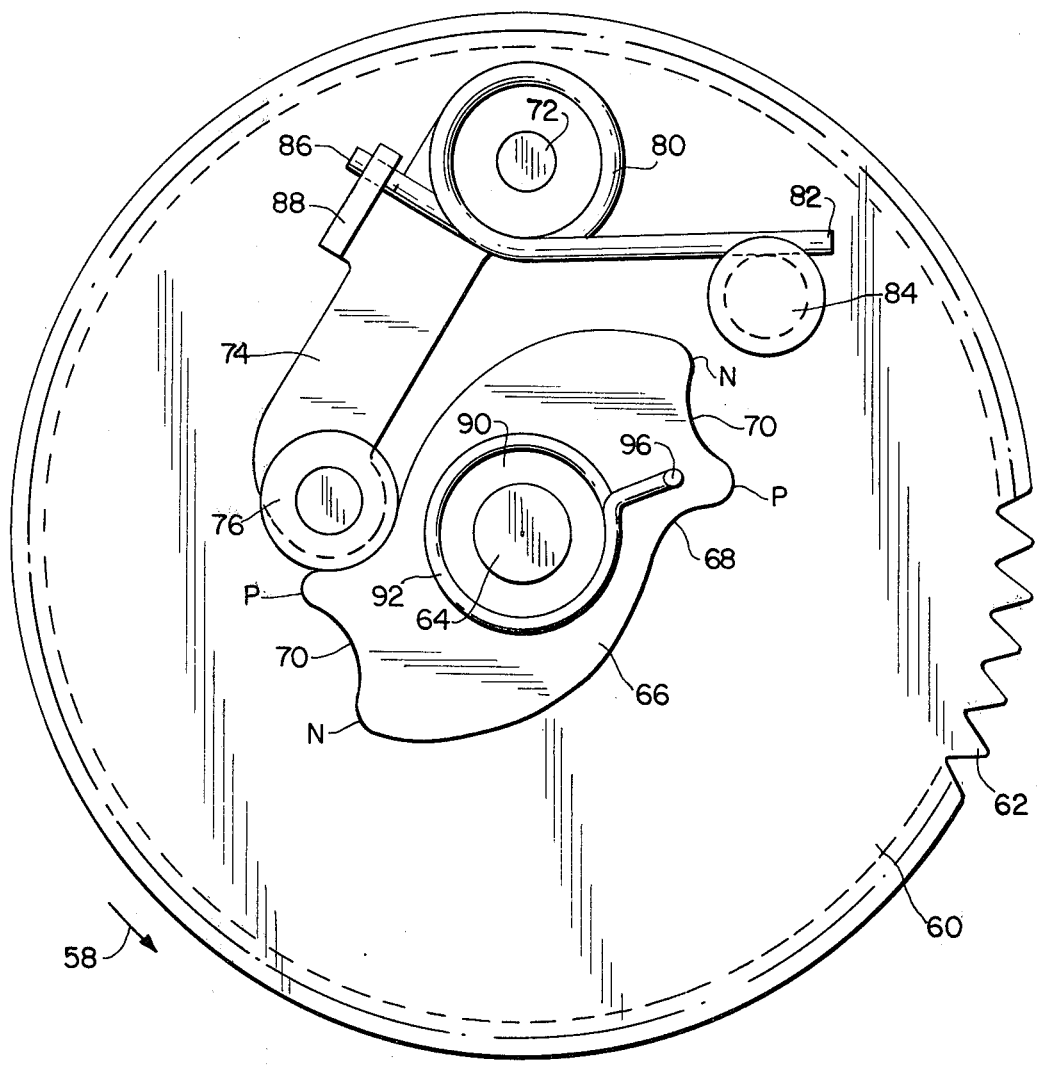
FIG. 3 is a top view of a second embodiment of the present invention.

A further embodiment of the present invention is shown in FIG. 3 where a disk 60 has exterior gearing 62 about its circumference (only partially shown). An S-shaped cam means is rotatably mounted at pivot axis 64 on disk 60. The cam 66 has depressions 68 on its long sides with intermediate depressions 70 on the end sides, the intermediate depressions extend from point P to point N.

In this embodiment, the cam biassing means comprises swinging contact link 74 which is pivotally mounted about pivot 72 on disk drive 60. A lever spring 80, secured around pivot 72 has one end resting against peg 84 attached to drive disk 60 and the other end biassing projection 88 on contact link 74 and thus biasses the link towards cam 66. It can be seen that as the cam rotates relative to the contact line, the contact roller 76 mounted on the end of link 74 permits free following of the cam contour by the contact link.

Cam 66 includes a ring-shaped pivot 90 extending out of the cam having a winding spring 92 wound therearound. This spring has a bent end portion 96 which may be connected to a shutter release mechanism (not shown).

It should be noted that in the FIG. 3 embodiment as opposed to the FIGS. 1 and 2 embodiment, the cam biassing means (in the form of driver disk 60 and contact link 74) is driven by the motor whereas in previous embodiment, the cam means (in the form of the square block 12) was driven by the motor. Thus, the motor can drive either structure with the same achievable results. However, because it is desirable that the shutter coupling means (spring 52 in FIG. 1 and spring 92 in FIG. 3) be associated with the means which is not directly driven by the motor, some repositioning of the spring in FIG. 3 would be necessary if the cam 66 were driven by the motor.

Continuing now with the operation of the FIG. 3 embodiment, the motor drives the disk by means of gear teeth 62 in a direction indicated by arrow 58. The biassing of lever spring 80 maintains contact roller 76 of the contact link against cam 66. If there is no resistance to movement by the film transport drum to which the cam 66 is rotatably connected, then the contact roller will maintain its position in one of two depressions 68 as shown in FIG. 3. Cam 66 will in turn rotate at the same angular velocity as the driven disk, causing the film transport advance drum to rotate, advancing the film and cocking the camera. When the film has been advanced one complete frame, the film transport drum in the camera will be stopped against further movement. Cam 66 then will also stop. The continuing operation of the drive motor will force contact roller to roll over contact point P into intermediate depression 70.

If the disk 60 is driven further, the contact roller 76 will roll over point N. Just past point N, the biassing of the contact roller towards the center of rotation of cam 66 will cause the cam to rotate in a direction opposite to the driven direction relative to the disk 60. This rotation in a direction opposite to the drive direction is similar to the rotation discussed with reference to the FIG. 1/FIG. 2 embodiment.

The FIG. 3 embodiment like the FIG. 1/FIG. 2 embodiment has a winding spring 92 which when rotated in the driven direction by cam 66 "free wheels" and when rotated in a direction opposite to the driven direction, again under the influence of cam 66 will frictionally grip the ring-shaped pivot 90 causing the bent portion of the spring 96 to operate the shutter release mechanism of the camera. This motion of the cam in the direction opposite to the drive direction continues until the contact rollers comes to rest in the next depression 68. At this point, a new cocking cycle will begin. As can clearly be seen, because the shutter release mechanism is only actuated by bent portion 96 when cam 66 is turning in a direction opposite to the drive direction, and because the cam does not turn in this direction until the film transport advance drum has stopped, there is no possibility for shutter release while the film is being moved in the camera. This completely eliminates any possibility of blurring of the image on the film.

Obviously, two or more connecting links could be utilized and/or the cam shape could be changed in order to achieve different motion characteristics of the cam when the film transport advance drum stops. It is only necessary that a certain amount of movement in a direction opposite to the drive direction be provided by the cam and cam biassing means and that the shutter coupling means triggered the shutter release mechanism during this opposite direction movement.

FIG. 4 illustrates one embodiment of a shutter release mechanism which would be compatable with the present invention. A two-armed lever 100 is rotatably mounted about pivot 98. The left arm (as shown in FIG. 4) has a notch 102 therein in which the bent end 96 of winding spring 92 is positioned. At the right arm of lever 100 is an upwardly-projecting release projection 104 which would contact the shutter release mechanism of the camera. Also, a guide place 108 may be provided having a roughly kidney-shaped slot 106 therein through which the bent end 96 of winding spring 92 extends. This kidney-shaped slot 106 serves to limit the excursions in a radial direction of the winding spring 92. It can be seen that the coiling of winding spring 92 about pivot 90 will prevent movement of the bent portion 96 when the pivot moves in the drive direction 58 (counterclockwise). However, if the pivot moves in a direction opposite to the drive direction (clockwise) the spring will tend to tighten around pivot and cause the bent portion 96 to move through the kidney-shaped slot 106. This movement will carry two-armed lever 100 with it causing projection 104 to actuate the shutter release mechanism. There are obviously many other mechanisms which will provide both the free wheeling in one direction and frictional contact rigidity in the other direction of rotation (as does winding spring 92) and the actuation of a shutter release mechanism in response to such movement (as does two-armed lever 100).

Thus it can be seen that the present invention may be designed as an accessory for present commercially available cameras or it could be built into cameras for marketing in the future.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property of privilege is claimed are defined as follows:

We claim:

1. A coupling connecting a drive motor to a still camera to facilitate automated cocking and actuation of said camera, said camera including a film transport advance drum, a shutter release and a shutter release mechanism and a drive motor, said coupling comprising:
   cam means, rotatable with one of said drive motor and said film transport advance drum in a drive direction;
   cam biassing means, rotatable with the other of said drive motor and said film transport advance drum, said cam biassing means includes means for transmitting torque from said drive motor to said film transport advance drum, said transmitting means rotating with said cam means until a predetermined maximum torque is reached, said transmitting means driving said cam biassing means a predetermined distance in a direction opposite to said drive direction when said maximum torque is exceeded, said predetermined distance determined by said cam means; and
   shutter coupling means, responsive to said cam biassing means movement in said direction opposite to said drive direction, for actuating said shutter release mechanism, said actuating means freely rotatable in said drive direction with respect to said cam biassing means and fixed against rotation in said direction opposite to said drive direction with respect to said cam biassing means.

2. A coupling in accordance with claim 1, wherein said cam means is rotatable with said drive motor and said cam biassing means is rotatable with said film transport advance drum.

3. A coupling in accordance with claim 2, wherein said cam means comprises a noncircular cam driven by said drive motor and said cam biassing means comprises an elastically deformable means in contact with said non-circular cam.

4. A coupling in accordance with claim 3, wherein said shutter coupling means is mounted on said cam biassing means.

5. A coupling in accordance with claim 4, wherein said shutter coupling means comprises:
   a gudgeon means mounted on said cam biassing means, said gudgeon means rotatable with said cam biassing means; and
   spring means, mounted around said gudgeon means, having a portion for contacting said shutter release mechanism, such spring means rotatable relative to said gudgeon means in a direction opposite to said drive direction and non-rotatable relative to said gudgeon means in said drive direction.

6. A coupling in accordance with claim 5, wherein said elastically deformable means comprises at least one leaf spring in contact with said non-circular cam.

7. A coupling in accordance with claim 6, wherein said elastically deformable means comprises two leaf springs and said non-circular cam comprises a cam having a substantially square cross-section, said cam disposed between said two leaf springs.

8. A coupling in accordance with claim 7, wherein said cam biassing means further includes a hollow cylindrical body including means mounting said leaf springs therein with said non-circular cam sandwiched between said two leaf springs.

9. A coupling in accordance with claim 1, wherein said cam biassing means is rotatable with said drive motor and said cam means is rotatable with said film transport advance drum.

10. A coupling in accordance with claim 9, wherein said cam biassing means comprises a drive disk, driven by said drive motor, and a link means, mounted on said disk, for biassing said cam.

11. A coupling in accordance with claim 10, wherein said link means comprises:
at least one pivotable link pivotally mounted at one end; and
means biassing said pivotable link into contact with said cam.

12. A coupling in accordance with claim 11, wherein said means biassing said pivotable link into contact with said cam comprises a coil spring having two ends, one end of which is fixed with respect to said drive disk, and the other end of which is fixed with respect to said pivotable link, said coil being located around said pivotally mounted end of said pivotable link.

13. A coupling in accordance with claim 12, wherein said other end of said pivotable link includes a roller, said roller being biassed into contact with said cam means by said coil spring.

14. A coupling in accordance with claim 13, wherein said cam means comprises an elongated S-shaped cam with at least two depressions at the ends of said S-shaped cam, wherein said roller rests in at least one of said depressions when said transmitting means is rotating with said cam means until a predetermined maximum torque is reached.

15. A coupling in accordance with claim 14, wherein when said predetermined maximum torque is reached, said roller on said pivotable link moves out of said depression, said cam being so shaped so as to rotate in a direction opposite to said drive direction under the influence of said roller on said pivotal link being biassed against said cam shape.

16. A coupling in accordance with claim 15, wherein said shutter coupling means comprises;
a ring-shaped pivot mounted on said cam means; and
a coil spring mounted on said ring-shaped pivot, said coil spring having at least one end for contacting said shutter release mechanism, said coil spring cooperating with said ring-shaped pivot such that said spring is free to rotate around said ring-shaped pivot in a direction relative to said cam which is opposite said drive direction, said coil spring frictionally retained against movement with respect to said ring-shaped pivot in a direction with respect to said cam in said drive direction.

17. A coupling in accordance with any one of claims 1-16, wherein said shutter release mechanism includes a two-armed lever, mounted for rotation about a pivot, one of said arms having a slot therein, said slot responsive to said shutter coupling means during rotation of said cam biassing means in said direction opposite to said drive direction, the other end of said two-armed lever actuating said shutter release of said camera.

* * * * *